United States Patent Office 3,730,681
Patented May 1, 1973

3,730,681
BASIC DYED POLYESTER FIBER MODIFIED WITH A DIHYDROXYALKOXY-PROPYL OR BUTYL SULFONATE
Louis E. Trapasso, Westfield, and Robert W. Stackman, Morristown, N.J., assignors to Celanese Corporation, New York, N.Y.
No Drawing. Application Sept. 26, 1966, Ser. No. 581,719, now abandoned, which is a continuation-in-part of application Ser. No. 502,520, Oct. 22, 1965. Divided and this application Feb. 2, 1971, Ser. No. 112,025
Int. Cl. D06p 5/04
U.S. Cl. 8—168        2 Claims

ABSTRACT OF THE DISCLOSURE

A polyethylene terephthalate fiber containing 1,2-dihydroxy - 3 - (3 - sodium sulfopropyoxy) propane and permeated uniformly throughout by a cationic dye, said dye being bound in the fiber by the available groups in the fiber.

---

This is a divisional of Ser. No. 581,719, filed Sept. 26, 1966, now abandoned, which is a continuation-in-part application of our copending application U.S. Ser. No. 502,520, filed Oct. 22, 1965, now abandoned.

This invention relates to compositions and shaped articles made therefrom of improved dyeability and consisting of linear thermoplastic polymers, novel organic sulfonates useful therein and the process of producing same.

Successful methods have been suggested in the past to improve the dyeability of shaped articles made from synthetic polymers such as fibers, fabrics or films specially utilizing basic dyes to provide brighter colors and also to permit cross dyeing of the articles. These methods utilize the techniques of incorporating sulfonated monomers into synthetic polymers such as polyester, nylon, polypropylene and the like to provide copolymers. Typical of this procedure is U.S. 3,018,272 which describes the process of producing basic dyeable polyesters having incorporated therein as comonomers sulfonated monomers. In the prior art, the use of sulfonated monomers to form copolymers with polyester is considered essential. If sulfonated monomers which do not form copolymers with polyesters are employed the resulting fibers and films formed from these heterogeneous mixtures do not permit uniform dyeing.

It has now been discovered that certain organic sulfonates may be successfuly utilized in improving the basic dye uptake of linear thermoplastic polymers. Specifically, it has been found that those organic sulfonates which dissolve in the synthetic linear polymers form a mixture which in turn can be shaped into highly desirable fibers and films having permanent and uniform basic dye uptake sites throughout the shaped article. This is indeed an unexpected development since heretofore it was not known that organic sulfonates would dissolve in linear thermoplastic polymers. General knowledge of the art indicated that organic sulfonates formed heterogeneous mixtures with such polymers. The present discovery provides a considerable advantage since it permits the use of many organic sulfonates which, in accordance with prior teachings, could not be employed since they could not function as a comonomer in the linear polymer formation.

The selection of appropriate organic sulfonates, i.e., those which form a homogeneous mixture with the linear polymer, involves the use of a test procedure with which suitable organic sulfonates may be determined. The selected organic sulfonate is blended with the monomers of the specific polymer, e.g., for polyesters, bis(2-hydroxyethyl)terephthalate, or alternatively may be blended with the partially polymerized polymer or after the polymer is formed. A suitable test procedure for determining solubility in the polymer of an organic sulfonate in the form of a metal salt is the use of a chloroacetic extraction technique on the polymer containing the sulfonate.

Prior to the extraction procedure a sulfur analysis is made of the polymer containing the metal containing organic sulfonate. A specific amount of polymer is then exposed to warm chloroacetic acid, using a typical extraction procedure. In general, at least two extractions are used. The chloroacetic acid will extract the soluble metal containing organic sulfonate to remove approximately 90 percent of the soluble material from the polymer after the second extraction. This can be determined by a sulfur analysis of the extracted polymer. If the polymer is a copolymer of a metal containing organic sulfonate, the chloroacetic acid technique will not remove the organic sulfonate. If the organic sulfonate is insoluble in the polymer, the polymer can be visually observed to be heterogeneous in view of the presence of insoluble material.

On dyeing the shaped structure with the desirable basic dye, the soluble metal containing organic sulfonate is reacted with the dye in the polymer making the sulfonate unextractable. Obviously then, in determining solubility, the sulfonate-containing polymer should be in the form of the polymer prior to shaping the polymer into a fiber or filament.

Those sulfronates which dissolve in the polymer to the extent of at least 0.5 weight percent based on the polymer are, for the purpose of this invention, to be considered soluble. Preferably, the sulfonates should be soluble to the extent of about 8 weight percent for best results.

A preferred class of organic sulfonates are novel linear thermoplastic polymer-soluble compounds of the following formula:

(I)

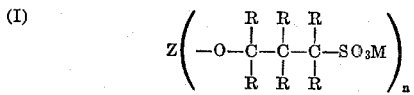

wherein Z is alkyl, aryl or aralkyl radical or substituted derivatives thereof in which the substituents include hydroxy, alkyl or alkoxy groups; R, in each instance, represents a hydrogen or alkyl radical; M is an alkali metal, preferably sodium, potassium or lithium; and $n$ has a value of at least 1 and preferably not greater than 2. Of course, in compounds where $n$ is greater than one, Z is appropriately a di, tri or polyvanent radical. For example, where $n$ is 2, Z is alkylene, arylene or aralkylene.

Of the foregoing compounds, a particularly preferred class is represented by the following formula:

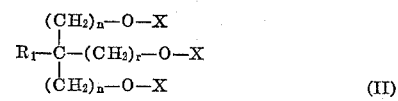

(II)

wherein $R_1$ is hydrogen or alkyl containing 1 to 6 carbon atoms, $n$ has a value from 1 to 3, $r$ has a value from 0 to 3 and X, individually, is hydrogen or a sulfonated structure having the formula:

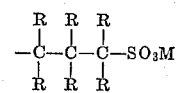

wherein R represents hydrogen or an alkyl radical containing from 1 to 6 carbon atoms and M is an alkali metal preferably sodium potassium and lithium, wherein at least one sulfonated radical X must be present in the structure II.

The preferred novel class of sulfonated alhiphatic compounds of this invention can be prepared by the reaction of sultone and the polyhydric type alcohol having the formula:

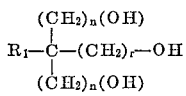

wherein $R_1$ is hydrogen or an alkyl group containing 1 to 6 carbon atoms, $n$ has a value from 1 to 3 and $r$ has a value from 0 to 3.

Compounds illustrative of the preferred poly-soluble organic sulfonates include:

(3-sodium sulfopropoxy)benzene;
(3-potassium sulfopropoxy)benzene;
1,4-bis[(3-sodium sulfopropoxy)methyl]benzene;
1,3-bis(3-potassium sulfopropoxymethyl)benzene;
2,2-bis(3-sodium sulfopropoxyphenyl)propane;
α-(3-sodium sulfopropoxy)ethylbenzene;
1,2-bis[α-(3-sodium sulfopropoxy)ethyl]benzene;
α-(3-potassium sulfopropoxy)ethylbenzene;
1,3-bis[α-(3-sodium sulfopropoxy)ethyl]benzene;
(3-sodium sulfopropoxymethyl)benzene;
(3-potassium sulfopropoxymethyl)benzene;
(3-sodium sulfobutoxy)benzene;
(3-potassium sulfobutoxy)benzene;
1,3-dihydroxy-2-(3-sodium sulfopropoxy)propane;
2,2-dimethylol-1-(3-sodium sulfopropoxy)butane;
1,6-dihydroxy-3-(3-sodium sulfopropoxy)hexane;
1,5-dihydroxy-3-(3-sodium sulfopropoxy)pentane;
2,3-bis-(3-sodium sulfopropoxy)propanol;
1,2-dihydroxy-3-(3-sodium sulfopropoxy)propane; and the like.

The novel class of sulfonated aliphatic compounds of this invention are prepared by heating at least equimolar quantities of the alcohol corresponding to radical Z in the formula, ZOH with sultones in the presence of alkali hydroxides preferably at temperatures in the range from about 30° C. to about 150° C. to produce the class of sulfonated compounds described. Typical of polyhydric type alcohols are, among others, glycerine, trimethylol ethane, trimethylol propane, trimethylol butane, trimethylol hexane, triethanol ethane, pentaerythritol, triethanol propane, triethanol hexane, tripropanol ethane, tripropanol butane, tripropanol hexane and the like. Other illustrative alcohols include hexamethylene glycol, butylene glycol, tertiary butanol, phenylethanol, di(hydroxymethyl)benzenes, phenol, cresol, hydroxymethylbenzene, 2,2-bis(4-hydroxyphenyl)propane, hexanols, pentanols and the like, i.e., alcohols in which the organic radical corresponds to the radical Z as defined hereinbefore.

The sultones which are reacted with the trihydric type alcohols can be described generically in the following formula:

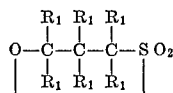

wherein $R_1$, individually, represents hydrogen or alkyl radicals containing from 1 to 6 carbon atoms. Suitable sultones include, among others: 1,3-propane sultone, 1,3-butane sultone, 1,3-isohexane sultone, 1,3-hexane sultone and the like.

The alkali hydroxides suitable for use in the process herein preferably include sodium hydroxide, potassium hydroxide and lithium hydroxide. The alkali hydroxides in some cases are used preferably in an excess of organic vehicle or medium, preferably benzene, toluene, orthoxylene, meta-xylene, para-xylene, mixtures thereof and the like to permit azeotropic distillation of the water produced in the reaction to prevent the reaction from reversing.

The temperature conditions utilized in preparation of the novel aliphatic sulfonated compounds of this invention from about 30° C. to about 150° C., preferably from 50° C. to 120° C. The reaction can be carried out at atmospheric pressure, superatmospheric pressures or subatmospheric pressures, as is convenient.

The surprisnig feature of the novel sulfonated compounds of this invention is the solubility in synthetic linear polymers such as polyethylene terephthalate. It has also been unexpectedly discovered that the sulfonated compounds of this invention do not in general form copolymers when present in the overall polymerization of the synthetic linear polymers especially polyethylene terephthalate but remain essentially as homogenous mixtures.

The new compositions of the present invention, i.e., containing the soluble sulfonated compounds and polymerized synthetic linear polymers, are useful in the production of shaped atricles by extrusion, molding, casting or the like. These shaped articles in turn may be formed into fibers (filaments and staple), fabrics, ornaments, films or the like.

The presence of soluble sulfonated compounds in the synthetic linear polymers is to provide dye sites especially for basic dyes. It is usually desirable to use at least about 0.5 weight percent of the sulfonate salt based on the total mixture. Polymer mixtures having a sulfonated salt content lower than 0.5 weight percent will usually have only a relative low affinity for basic dyes. Polymer mixtures containing about 10 weight percent of the sulfonated compound have a very high affinity for basic dyes. Higher concentrations will not lead to appreciable increases in basic dyeability and in general may unduly affect tenacity in the shaped articles. The sulfonated compound concentrations in the range from 2 to 8 weight percent of the total mixture, are preferred.

The term "linear thermoplastic polymer" as used herein includes polymeric polymethylene terephthalates, especially preferred is polyethylene terephthalate. Other polymers which can be included herein utilized herein are polyalkylene terephthalate containing modifiers such as dibasic acids including among others; isophthalic acid, sebacic acid, adipic acid and the like. Cyclic glycols can also be substituted for the alkylene glycols in the linear terephthalate polymers. Other polymers included herein are polyamides such as polyhexamethylene adipamide, polyhexamethylene sebacamide, polytetramethylene sebacamide, polytetramethylene adipamide and the like. Other polyamides include those prepared from di(4-aminocyclohexyl) ethane or 1,6-(4-aminocyclohexyl)hexane as the diamine components. Additional polymers include polypropylene, polybutenes and the like. As is known, the intrinsic viscosities of the above-described polymers should be in excess of 0.2, preferably in the range from 0.4 to 1.0 when used for producing textile and industrial products.

Various other materials may be present in the present new compositions. For example, such ester exchange catalysts as salts of calcium, magnesium, manganese and the like and such polymerization catalysts as antimony oxide, antimonic acid or the like, may be used. In addition, pigments, delusterants, or other additives such as titanium dioxide or barium carbonate.

The yarns or filaments produced in accordance with the present invention are suitable for the usual textile applications. They may be employed in the knitting or weaving of fabrics of all types as well as in the production of nonwoven, felt-like products produced by known methods. Their physical properties closely parallel those of their related non-modified polymer fibers. However, they have particular sensitivity toward basic dyes. By a "basic dye" is meant a colored cationic organic substance such as those containing sulfonium, oxonium or quaternary ammonium functional groups. Among the basic types which may be applied to the filaments formed in accordance with the present invention may be mentioned Victoria Green WB(C.I. 657); Thodamine B(C.I. 749); Brilliant Green B(C.I. 662); Victoria Pure Blue BO(Pr 198); Sevron Blue B; and the like. The dyes are preferably applied from an aqueous solution at a temperature between 80° and 125° C.

Filaments and films, i.e., shaped structures which have at least one dimension relatively very small and at least one dimension relatively large, are the preferred structures of the present invention. Such structures of the polymer mixtures of this invention are permeated uniformly throughout by basic dyes applied from hot aqueous solution. The penetration of dyes is an important characteristic since poor resistance of fading and loss of color through rubbing or abrasion is a known characteristic of structures which retain dye only at their surfaces.

The following examples will serve to illustrate the invention:

EXAMPLE I

To a one liter three-necked flask equipped with a mechanical stirrer, thermometer and Dean-Stark trap is added 134 grams (1.0 mole) of trimethylol propane, 115 milliliters xylene and 115 milliliters toluene. To the solution in the reaction flask was added a solution of 41.2 grams (1.0 mole) of 97 percent sodium hydroxide in 40.0 milliliters distilled water. The rapidly stirred mixture was heated to reflux and the theoretical amount of water was collected in 3.5 hours. The initial pot temperature was 111° C. and the final pot temperature was 122° C. To the cooled suspension of the monosodium alkoxide of trimethylol propane in xylene-toluene was added a solution of 122 grams of 1,3-propane sultone in toluene. The mixture was heated to about 65° C. and an exothermic reaction took place. The reaction mixture was allowed to stand for three days. The solid product 2,2-dimethylol-1(3-sodium sulfopropoxy) butane was collected by filtration, washed with ethanol and dried in a vacuum oven at 80° C. overnight. The product weighed 184 grams and had a melting point of 152–155° C. Infra-red analysis confirm the structure of 2,2-dimethylol-1-(3-sodium sulfopropoxy) butane.

In a similar manner as the above example, triethanol propane and tripropanol hexane can be substituted for trimethylol propane while 1,3-butane sultone and 1,3-isohexane sultone can be substituted for 1,3-propane sultone.

EXAMPLE II

To a 500 milliliter three-necked flask equipped with stirrer, nitrogen inlet and distillation head are added 5.56 grams of 2,2-dimethylol-1-(3-sodium sulfopropoxy) butane dissolved in 20 milliliters of ethylene glycol, 0.14 grams antimonic acid and 200 grams of bis(2-hydroxyethyl) terephthalate. The flask was flushed three times with nitrogen, then heated to 227° C. at which temperature all the material had melted to form a clear solution. The temperature was increased slowly over a period of one hour to 270° C. The pressure was then slowly lowered by means of a vacuum pump to 0.10 mm. Hg pressure while the temperature was increased to 290° C. The polymerizing mixture was stirred at 290° C. and 0.10 mm. Hg pressure for one hour. At the end of this period, the vacuum was released and the polymer allowed to cool. The recovered polymer had an intrinsic viscosity of 0.47 determined in a mixture of 10 parts phenol and 7 parts trichlorophenol and a crystalline melting point of 242° C. The polymer mixture contained polyethylene terephthalate and 2,2-dimethylol-1-(3-sodium sulfopropoxy) butane. A portion of the polymer was placed in chloracetic acid wherein approximately 98 percent of the 2,2-dimethylol-1-(3-sodium sulfopropoxy) butane was removed in two abstractions. This indicates that the polymer product is a mixture of polyester polymer and the sulfonated product and not a copolymer.

The polymer was spun into fibers at 285° C. from a melt index apparatus and the fibers obtained oriented by stretching at least 3 times the spun yarn over a surface heated at 80° C. A sample of the oriented fiber was dyed in a Sevron Blue B basic dye bath for one hour at 95° C. The fibers dyed to a deep shade of blue having good washfastness properties.

In a similar manner as above polyhexamethylene adipamide can be substituted for the polyethylene terephthalate.

EXAMPLE III

In a reaction flask, one mole of glycerine (92.1 grams) is added with agitation to one mole of sodium hydroxide (99 grams of 40.4 weight percent aqueous solution at 80° C.). The reaction is slightly exothermic. Heat is applied to bring the temperature up to 95° C. Then one mole of 1,3-propane sultone (122 grams) is added with agitation. The reaction is highly exothermic and the temperature rises to 145° C. A small excess of propane sultone may be needed to reach neutrality. The product, 1,2-dihydroxy-3-(3-sodium sulfopropoxy) propane, solidifies when cooled to room temperature. The product is then washed with n-propyl alcohol, filtered and dried at 90° C. at reduced pressure.

The following properties of the resulting property were found:

| | |
|---|---|
| Melting point ° C. (differential tehrmal analysis) | 142 |
| Thermal stability (percent retained after 3 hours at 180° C.) | 91.9 |
| Percent sulfur found | 13.8 |
| Percent theory | 13.6 |
| Percent sodium found | 10.5 |
| Percent theory | 9.7 |

In a like manner 1,4-dimethylol benzene can be substituted for glycerine to produce 1,4-di[(3-sodium sulfopropoxy)methyl] benzene and polyethylene terephthalate polymer containing said sulfonates can be produced as described in Example IV.

EXAMPLE IV

To a 500 milliliter three neck flask equipped with stirrer, nitrogen inlet and distillation head are added 14 grams of 1,2-dihydroxy-3-(3-sodium sulfopropoxy) propane dissolved in 25 milliliters of ethylene glycol, 0.07 gram antimonic acid and 200 grams of bis(2-hydroxyethyl) terephthalate. The flask was flushed three times with nitrogen, then heated to 227° C. at which temperature all the material had melted to form a clear solution. The temperature was increased slowly over a period of one hour to 270° C. The pressure was then slowly lowered by means of a vacuum pump to 0.10 millimeter mercury pressure while the temperature was increased to 290° C. They polymerizing mixture was stirred at 290° C. and 0.10 millimeter mercury pressure for one hour. At the end of this period, the vacuum was released and the polymer allowed to cool. The recovered polymer had an intrinsic viscosity of 0.65 determined in a mixture of 10 parts phenol and 7 parts trichlorophenol and crystalline melting point of 250° C. The polymer mixture contained polyethylene terephthalate and 1,2-dihydroxy-3-(3-sodium sulfopropoxy) propane. A portion of the polymer was placed in chloroacetic acid wherein approximately 90 percent of the 1,2-dihydroxy-3-(3-sodium sulfopropoxy) propane was removed in two abstractions. This indicates that the polymer product is a mixture of polyester polymer and the sulfonated product and not a copolymer.

The polymer was spun into fibers at 285° C. from a melt index apparatus and the fibers obtained oriented by stretching at least three times the spun yarn over a surface heated at 80° C. A sample of the oriented fiber was dyed in a Sevron Blue B basic dye bath for one hour at 95° C., the fibers dyed to a deep shade of blue having good washfastness properties.

EXAMPLE V

In a one liter flask, were placed the following: 500 milliliters of heptane, 0.2 mole sodium (4.6 grams sodium and 4.6 grams toluene) and 0.1 mole (22.8 grams) 2,2-bis(4-hydroxyphenyl) propane. Thirty-two milliliters of ethyl alcohol were added to the flask and the material stirred for 16 hours. After 16 hours the reaction temperature increased to 68° C. The product, the sodium alkoxide of 2,2-bis(4-hydroxyphenyl) propane was obtained. To this reaction product, 0.2 mole (24.4 grams) 1,3-propane sultone was added and the mixture was heated for six hours at reflux. The reaction product, 2-2-bis(3-sodium sulfopropoxyphenyl) propane was filtered from the reaction solution and dried recovering 55 grams. The reaction product had a melting point of 257° C., thermal stability 81.12 percent (percent retained after 3 hours at 180° C.).

Found (percent): carbon, 46.69; hydrogen, 11.8; sodium, 9.22. Theory (percent): carbon, 48.8; hydrogen, 12.4; sodium, 8.9.

In the same manner as described in Example IV, approximately 4 weight percent, 2,2-bis(3-sodium sulfopropoxyphenyl) propane was added to 750 grams of bis(2-hydroxyethyl) terephthalate and polymerized in like manner as described in Example IV. The polymer obtained had an intrinsic viscosity of 0.647 and a softening point of 251° C. The 2,2-bis(3-sodium sulfopropoxyphenyl) propane was found to be soluble in the polymer.

The polymer was spun into fibers at 285° C. and the fibers oriented by stretching at least three times the spun yarn over a surface heated at 80° C. A sample of the oriented fiber was dyed in a Sevron Blue B basic dye bath for one hour at 95° C. The fibers dyed to a deep shade of blue having good washfastness properties.

What is claimed is:

1. A polyethylene terephthalate fiber having an intrinsic viscosity of at least 0.4 measured in a mixture of 58.8 parts of phenol and 41.2 parts of trichlorophenol wherein said fiber contains 1,2-dihydroxy-3-(3-sodium sulfopropoxy) propane in amounts ranging from about 2 weight percentage to about 8 weight percentage based on the total fiber, said fiber permeated uniformly throughout by a cationic dye, said dye being bound in the fiber by the available groups in the fiber.

2. The composition of claim 1 wherein 2,2-dimethylol-1-(3-sodium sulfopropoxy) butane is substituted for 1,2-dihydroxy-3-(3-sodium sulfopropoxy) propane.

References Cited
UNITED STATES PATENTS

| | | | |
|---|---|---|---|
| 3,018,272 | 1/1962 | Guffing | 260—75 S |
| 3,432,472 | 3/1969 | Caldwell | 260—75 S |

DONALD LEVY, Primary Examiner

U.S. Cl. X.R.

8—31, 173